(12) United States Patent
Hanagan et al.

(10) Patent No.: US 6,848,156 B2
(45) Date of Patent: Feb. 1, 2005

(54) METHOD OF MAKING A MOTORCYCLE SEATBACK

(75) Inventors: Michael W. Hanagan, Hollister, CA (US); Vicente S. Zavala, Hollister, CA (US)

(73) Assignee: Corbin Pacific, Inc., Hollister, CA (US)

( * ) Notice: Subject to any disclaimer, the term of this patent is extended or adjusted under 35 U.S.C. 154(b) by 116 days.

(21) Appl. No.: 10/366,146

(22) Filed: Feb. 13, 2003

(65) Prior Publication Data

US 2004/0098853 A1 May 27, 2004

Related U.S. Application Data

(63) Continuation-in-part of application No. 10/304,213, filed on Nov. 26, 2002, now Pat. No. 6,655,740.

(51) Int. Cl.$^7$ .............................................. B21D 53/88
(52) U.S. Cl. ........................ 29/91.1; 29/897.2; 29/29; 29/527.1; 264/239; 264/271.1; 297/352; 297/452.48; 297/452.49; 297/DIG. 2
(58) Field of Search .............................. 29/897.2, 91.1, 29/527.1, 525.01; 264/239, 259, 260, 271.1; 297/218.1, 218.2, 218.5, 255, 256, 256.1, 256.13, 243, 452.1, 452.46, 452.48, 452.58, DIG. 2, 352, 195.12, 354.12, 452.29

(56) References Cited

U.S. PATENT DOCUMENTS

| | | | |
|---|---|---|---|
| 1,961,145 A | 6/1934 | Harley et al. | |
| 3,971,112 A | * 7/1976 | Amato et al. | ............ 29/91.1 |
| 4,103,858 A | 8/1978 | Swenson | |
| 4,111,448 A | 9/1978 | Sklodowsky | |
| 4,313,639 A | 2/1982 | Ware | |
| 4,363,516 A | 12/1982 | Braly et al. | |
| D276,866 S | 12/1984 | Arnold | |
| 4,570,998 A | 2/1986 | Hughes | |
| 4,596,422 A | 6/1986 | Stahel | |
| 4,679,647 A | 7/1987 | Komuro | |
| D301,409 S | 6/1989 | Beckett | |
| 4,953,911 A | 9/1990 | Hanagan | |
| 5,026,119 A | 6/1991 | Frank et al. | |
| 5,069,837 A | * 12/1991 | Sember et al. | ............ 264/45.2 |
| 5,544,937 A | 8/1996 | Hanagan | |
| 5,608,957 A | 3/1997 | Hanagan | |
| 5,667,232 A | 9/1997 | Gogan et al. | |
| 5,779,303 A | 7/1998 | Kuelbs et al. | |
| 5,997,088 A | 12/1999 | Stark et al. | |
| 6,007,150 A | 12/1999 | Clerkin et al. | |
| D422,421 S | 4/2000 | Hoagland | |
| 6,068,334 A | 5/2000 | Bonfilio | |
| 6,164,725 A | 12/2000 | Santa Cruz et al. | |
| 6,224,081 B1 | 5/2001 | Wayman et al. | |

* cited by examiner

Primary Examiner—David P. Bryant
Assistant Examiner—Jermie E. Cozart

(57) ABSTRACT

A method of making a motorcycle backrest which has a back support cushion with a handhold aperture, and a support arm for mounting the backrest on a motorcycle saddle or frame uses a mold with a cavity and central post. A rigid frame is encapsulated in a rigid resin base and a cushion layer is formed thereon. The base and cushion layer have an aperture extending therethrough. The flexible cover is formed about the cushion layer and about the periphery of the backrest structure and through the aperture, and it is secured to the surface of the rigid base. A protective cover plate is secured over the cover on the rigid base.

9 Claims, 8 Drawing Sheets

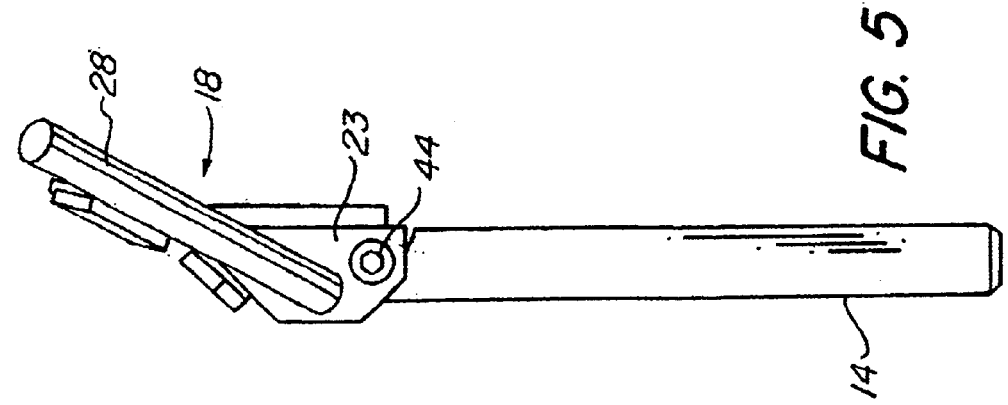
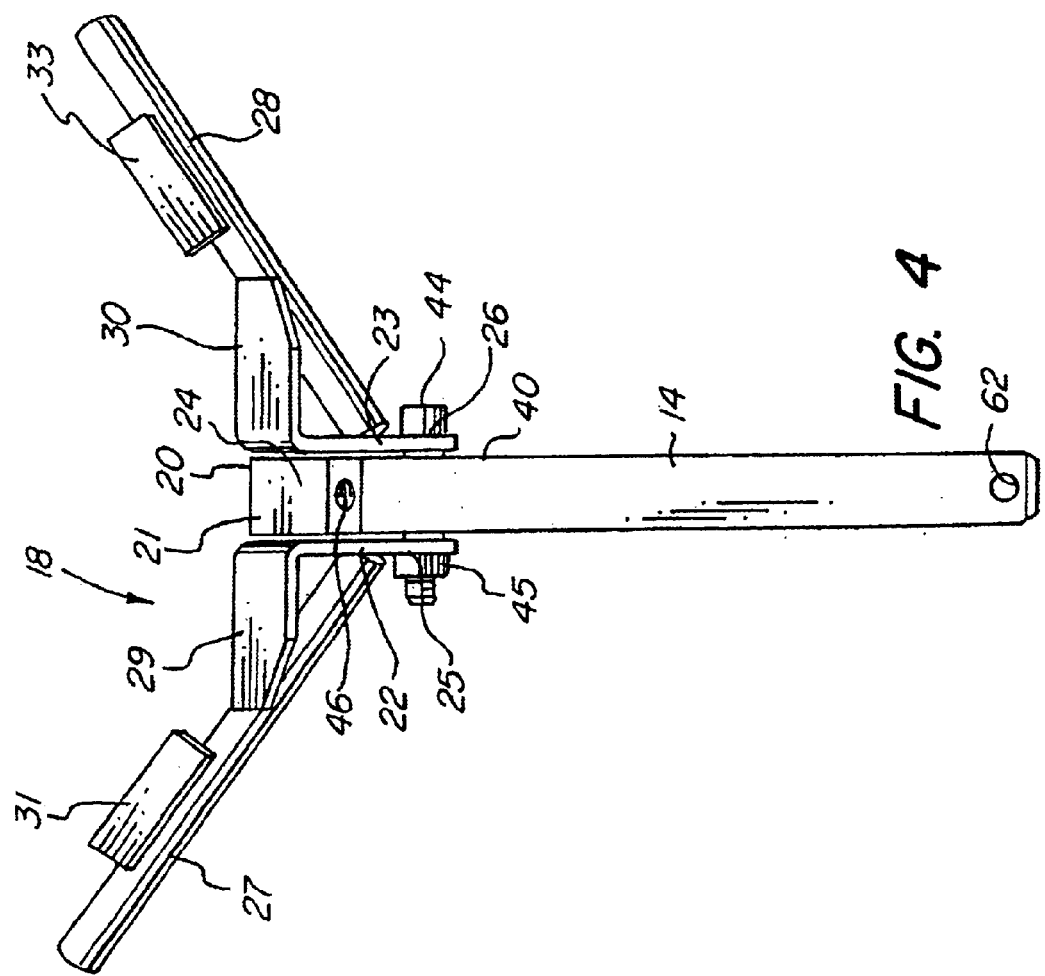

US 6,848,156 B2

METHOD OF MAKING A MOTORCYCLE SEATBACK

RELATED APPLICATION

This application is a continuation-in-part of U.S. application Ser. No. 10/304,213 filed Nov. 26, 2002 now U.S. Pat. No. 6,655,740.

BACKGROUND OF THE INVENTION

The present invention is directed to motorcycle backrests for the driver and/or passenger.

Backrests are included on some motorcycle saddles for the comfort of the driver and/or passenger. Typically, the backrests include a cushion that is mounted on a rigid post or arm which in turn is supported on the saddle or on the frame of the motorcycle. Such backrests can be made by molding a cushion onto a support plate and then gluing a cover over the cushion. The edges of the cover typically are stretched around to the rear side of the backrest and fastened along the bottom. When the backrest is intended for a passenger, it is mounted in such a way that it can be removed or folded down when it is not in use in order to optimize the aerodynamics of the vehicle.

Tandem motorcycle saddles are used for touring and not only include a passenger backrest, but also may include handholds positioned on the left and right sides of the passenger seat. Typically, such handholds are formed from metal bars, and may not be particularly comfortable for the passenger.

It is an object of the present invention to provide a novel method for making a motorcycle backrest which is attractive and comfortable.

It is also an object to provide an economical method of making a durable backrest which also can be used as a passenger handhold.

Another object is to provide a method for making such a motorcycle backrest which has minimal impact upon the aerodynamics of the vehicle and which can be conveniently used to secure cargo.

SUMMARY OF THE INVENTION

It has now been found that the foregoing and related objects can be readily attained in a method for making a motorcycle seatback with an aperture extending therethrough in which there is provided a mold having a base with a cavity providing the desired peripheral configuration for the backrest and an upstanding post centrally thereof. A channel extends through the side wall of the mold from the cavity to the exterior of the mold.

A first deposit of a resin formulation is introduced into the cavity about the post. One end of a rigid frame member having an arm extending outwardly of the mold cavity through the channel and having laterally extending arms on opposite sides of the post is placed on the first deposit of the resin formulation. A second deposit of a resin formulation is introduced into the cavity over the upper end of the frame member and about the mold post to bond with the first deposit and encapsulate the upper end of the frame member between the deposits. The resin formulations of the first and second deposits are at least partially cured.

A cushion resin formulation is then introduced into the mold cavity over the cured resin of the first and second deposits, and this resin formulation is curable into a resiliently deflectable cushion layer. The cushion resin formulation is cured to provide a seatback structure with an aperture extending therethrough and the arm depending therefrom.

The seatback structure is removed from the mold, and a flexible cover is formed over the surface of the cushion layer of the seatback structure and about the outer periphery thereof and through the aperture. The cover is secured to the opposite surface of the seatback structure, and a cover plate having an opening extending therethrough is secured to the opposite surface in alignment with the apertures in the seatback structure.

Preferably, the mold includes a cover and the method includes closing the cover over the mold cavity after the step of introducing the cushion resin formulation. The resin formulations of the first and second deposits is a fiber reinforced formulation which forms the rigid base. The cushion resin formulation is a foamable polyurethane formulation which expands to fill the mold cavity.

BRIEF DESCRIPTION OF THE DRAWINGS

FIG. 4 is a rear view of the post and the frame embedded within the backrest cushion;

FIG. 5 is a side elevational view of the backrest mounting assembly of FIG. 4;

DETAILED DESCRIPTION OF THE PREFERRED EMBODIMENT

Figure 1:
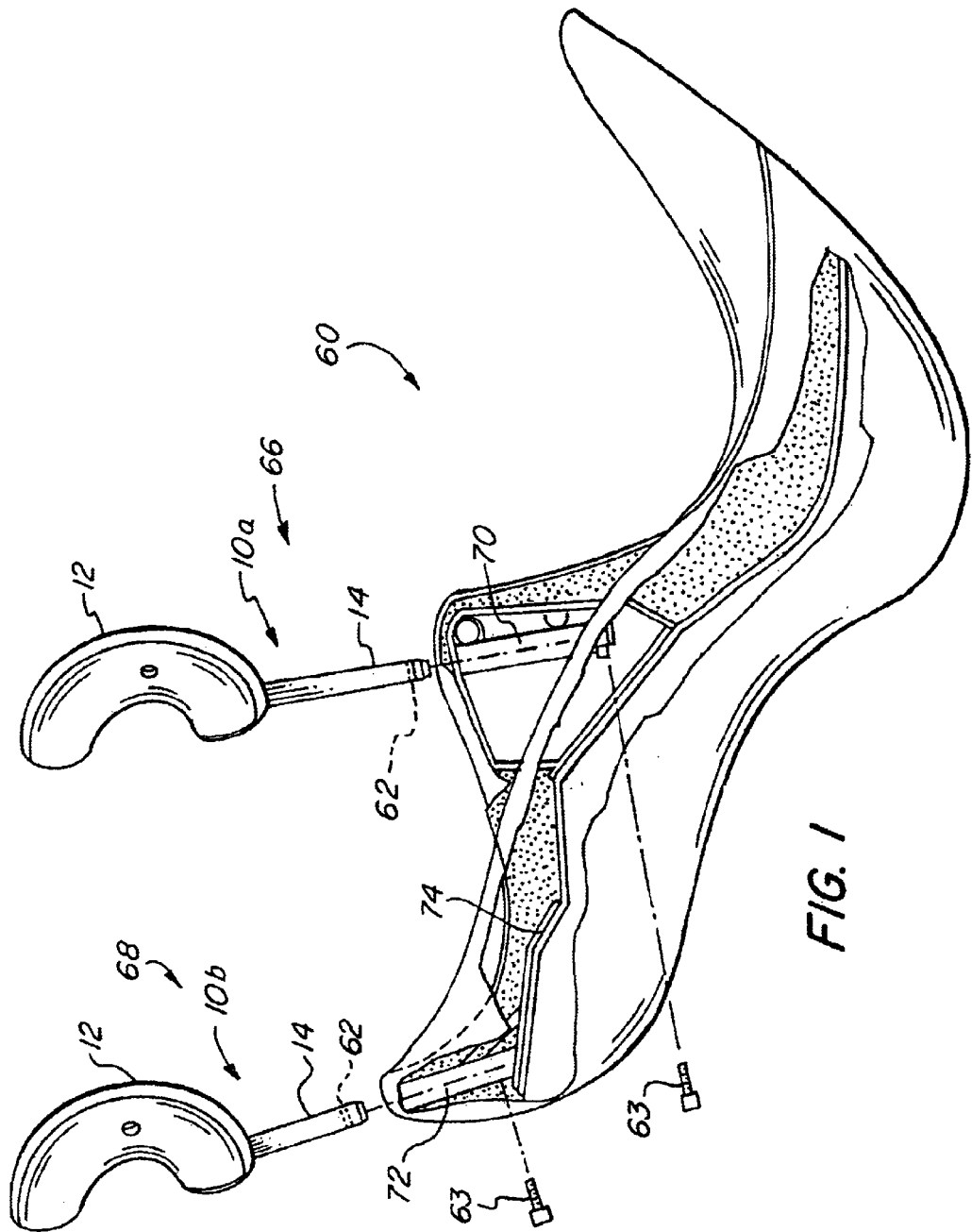
FIG. 1 is a partially exploded side view in partial section of a tandem motorcycle saddle showing driver and passenger backrests made in accordance with the present invention.
Figure 2:
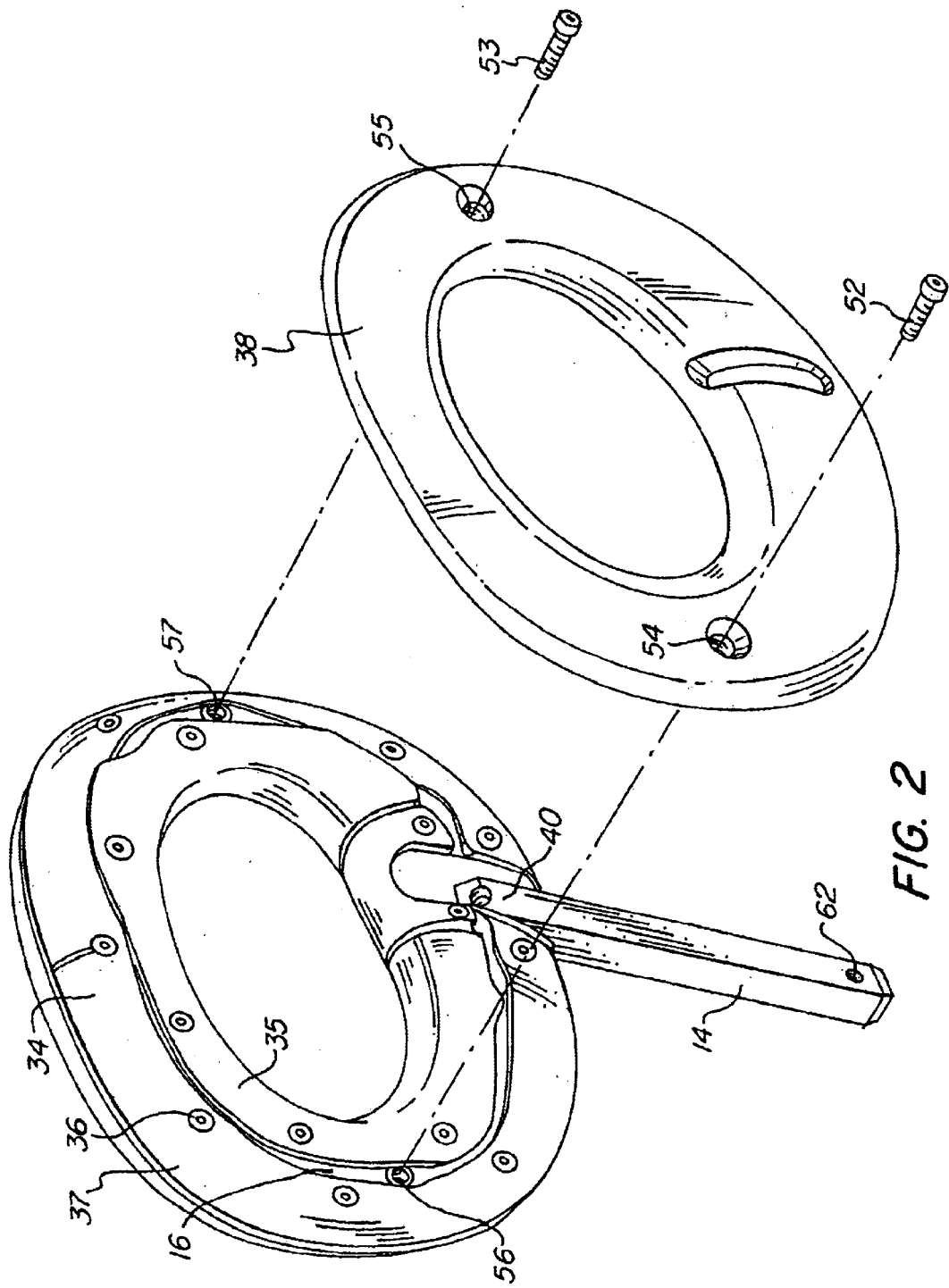
FIG. 2 is a rear perspective view of the backrest of FIG. 1 with the cover plate disassembled therefrom.

FIG. 1 illustrates a tandem motorcycle saddle generally designated by the numeral 60 with driver and passenger seat portions 66, 68, respectively, and driver and passenger backrests 10a, 10b, each having support arms or posts 14 which seat in receptacles 70, 72 secured to the platform 74 of the saddle. Bolts 63 extend through the receptacles 70, 72 and through passages 62 in the arms 14 to releasably secure the backrests 10 in assembly with the saddle. The backrests 10 have an aperture 15 extending therethrough.

As is shown in FIGS. 2–5, the cushion 12 includes a generally oval frame or base 16 disposed therewithin. A metal mounting assembly generally designated by the numeral 18 is supported on the frame 16 and includes a generally U-shaped bracket 20 with a central wall 21 and rearwardly extending side walls 22, 23 which define a channel 24 with a rectangular cross section for receiving the support arm or post 14. The side walls 22, 23 have aligned apertures 25, 26 therein.

A pair of upwardly and laterally outwardly extending rods 27, 28 have their inner ends mounted by welding or the like to opposite sides of the bracket 20 and are centrally supported by rigid arms 29, 30 which are integrally formed with bracket 20 and extend outwardly at the top of the bracket 20. Plates 31, 33 are welded to rods 27, 28 respectively and extend slightly upwardly therefrom. This configuration provides durability and strength to the connection between the frame 16 and the mounting assembly 18 by providing a substantial length of metal embedded or encapsulated in the molded frame 16, i.e., the entire length of rods 27, 28. As a result, the frame 16 can be constructed with a thickness that is about the same as the thickness of the bracket 20 while being sufficiently durable to withstand prolonged use.

A foam cushion 32 is molded over the front and edges of the frame 16 to provide a comfortable support, and a pliable cover 34 formed from leather, vinyl, or other suitable covering material is placed over the foam cushion 32 and fastened to the frame 16 with rivets 36 or the like. A finishing or cover plate 38 made of plastic, metal or other suitable material is mounted on the rear side of the frame 16. The cover plate 38 covers the peripheral portion 37 of the cover 34 and the interior portion 35 of the cover 34 which extends through the aperture 15 as well as the rivets 36 that secure the cover 34 to the base or frame 16 to provide an aesthetically pleasing appearance. The cover plate 38 is mounted using bolts 52, 53 which extend through apertures 54, 55 in the finishing plate 38 and seat in the threaded bores 56, 57 in the rear side of the frame 16.

Figure 3:
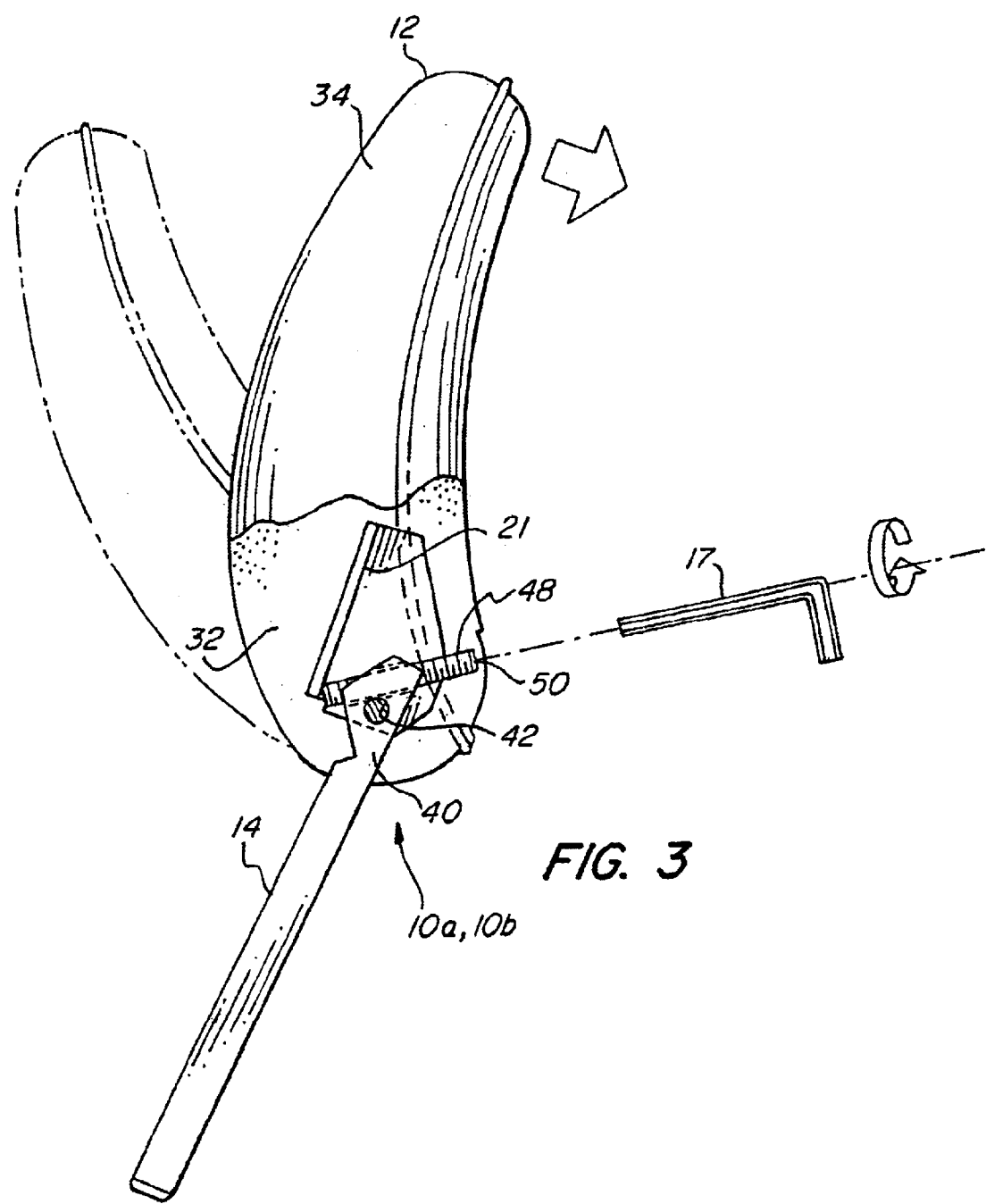
FIG. 3 is a side elevational view in partial section of the backrest showing the pivot mechanism and showing the back support cushion in full line in one position and in phantom line in an alternate position, and further showing a tool for altering attitude of the backrest on the post.
Figure 6:
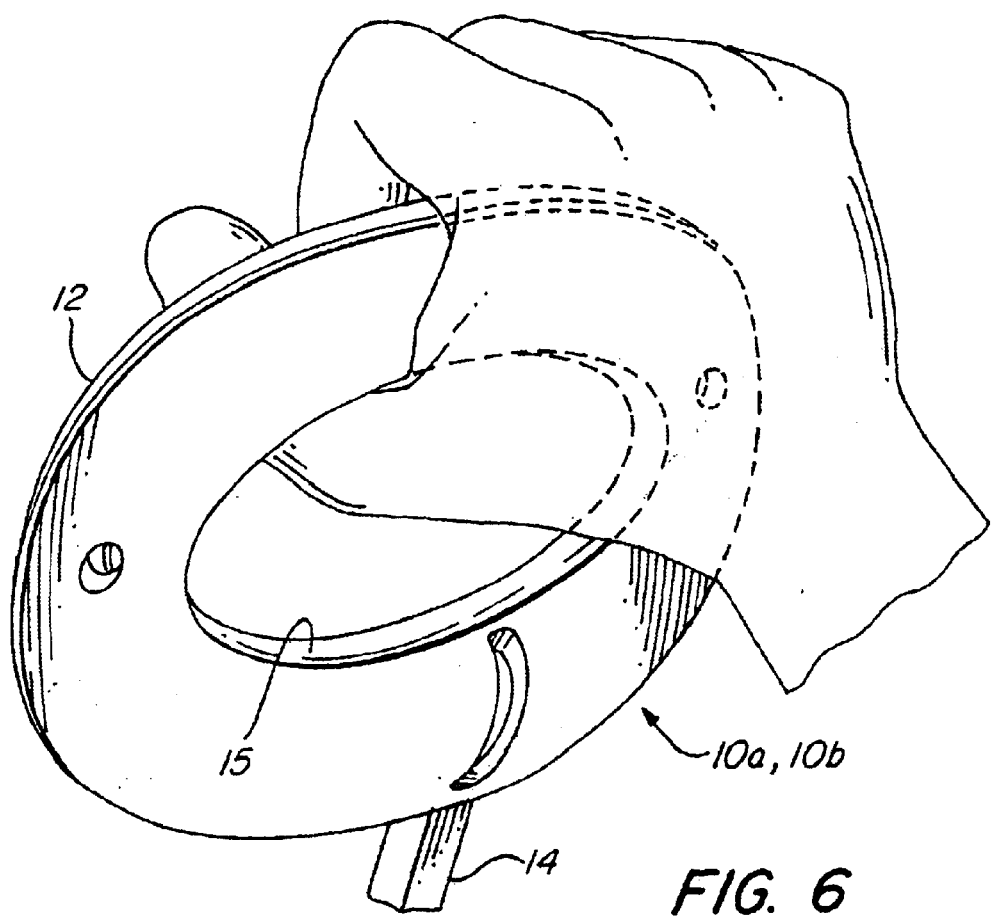
FIG. 6 is a rear perspective view of the driver backrest showing its use as a hand grip by a passenger.

FIGS. 3–5 illustrate the mechanism for pivoting the backrest 10 relative to the support arm 14. The upper end 40 of the support arm 14 has a bore 42 extending transversely therethrough and a pivot bolt 44 extends through the bore 42 and through apertures 25, 26 in the bracket 20 to pivotally mount the support frame 16 on the support arm 14. Nut 45 retains the bolt 44 in position.

The support arm 14 has a second bore 46 extending through the upper end 40 in a direction generally perpendicular to the pivot bolt 44 therebelow. A set screw 48 extends through the second bore 46 and abuts the central wall 21 of the bracket 20. Rotation of the set screw 48 within the bore 46 permits adjustment of the projecting length of the shank and thus an adjustable limitation of the pivoting of the cushion 12 on the support arm 14 in a rearward direction. The head 50 of the set screw 48 is located within the slot 24 in order to provide convenient access for adjusting the cushion 12 using an Allen wrench 17.

Figure 7:
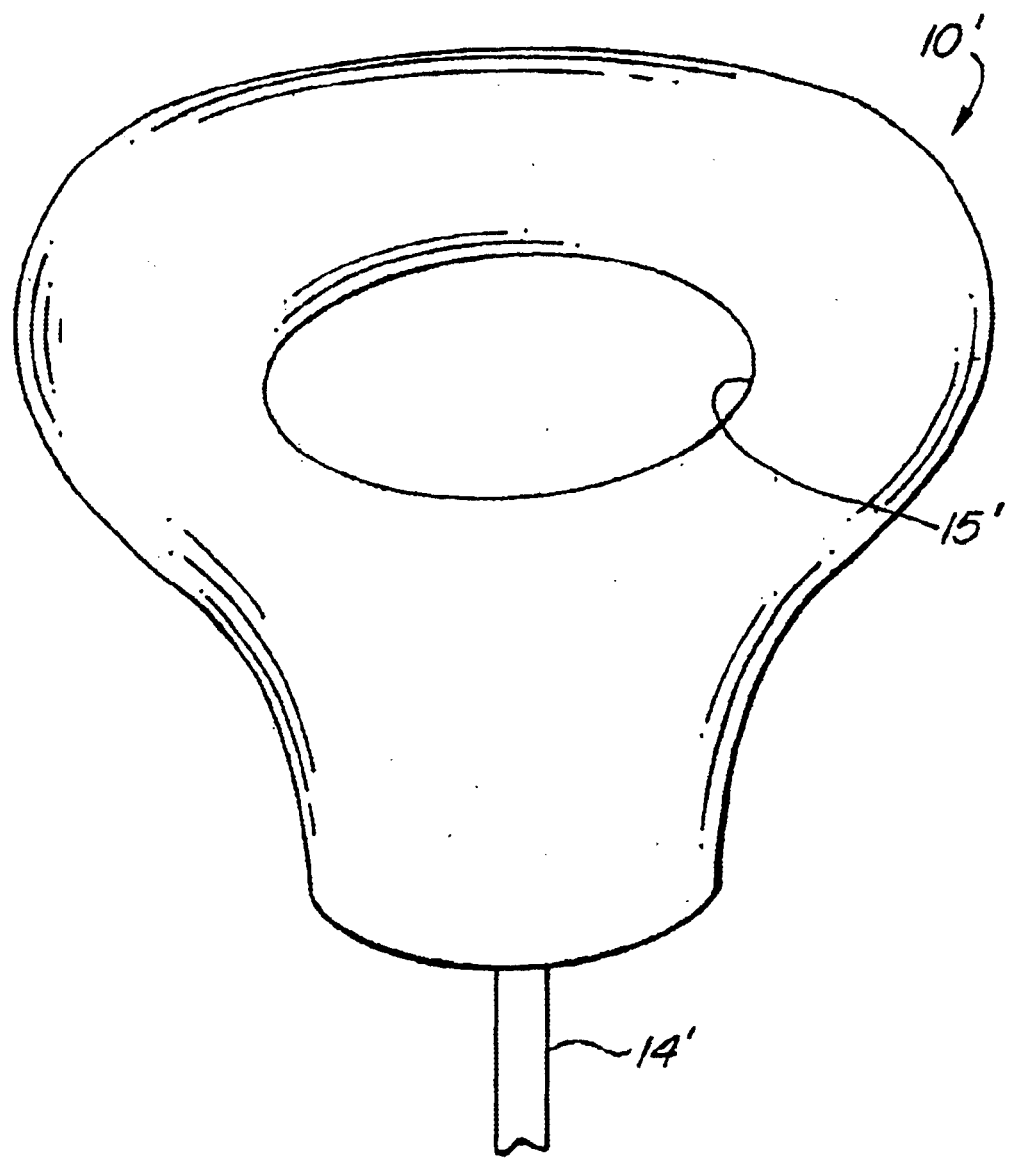
FIG. 7 is a front view of a second embodiment of a backrest made by the process of the present invention.

FIG. 7 shows a backrest 10' with a slightly different contour. The backrest 10' has an upside-down teardrop shape which provides additional legroom for a passenger when the backrest is used for the driver on a tandem saddle with a small passenger seat portion. The backrest may also have other configurations such as circular and ovate.

Figure 8:
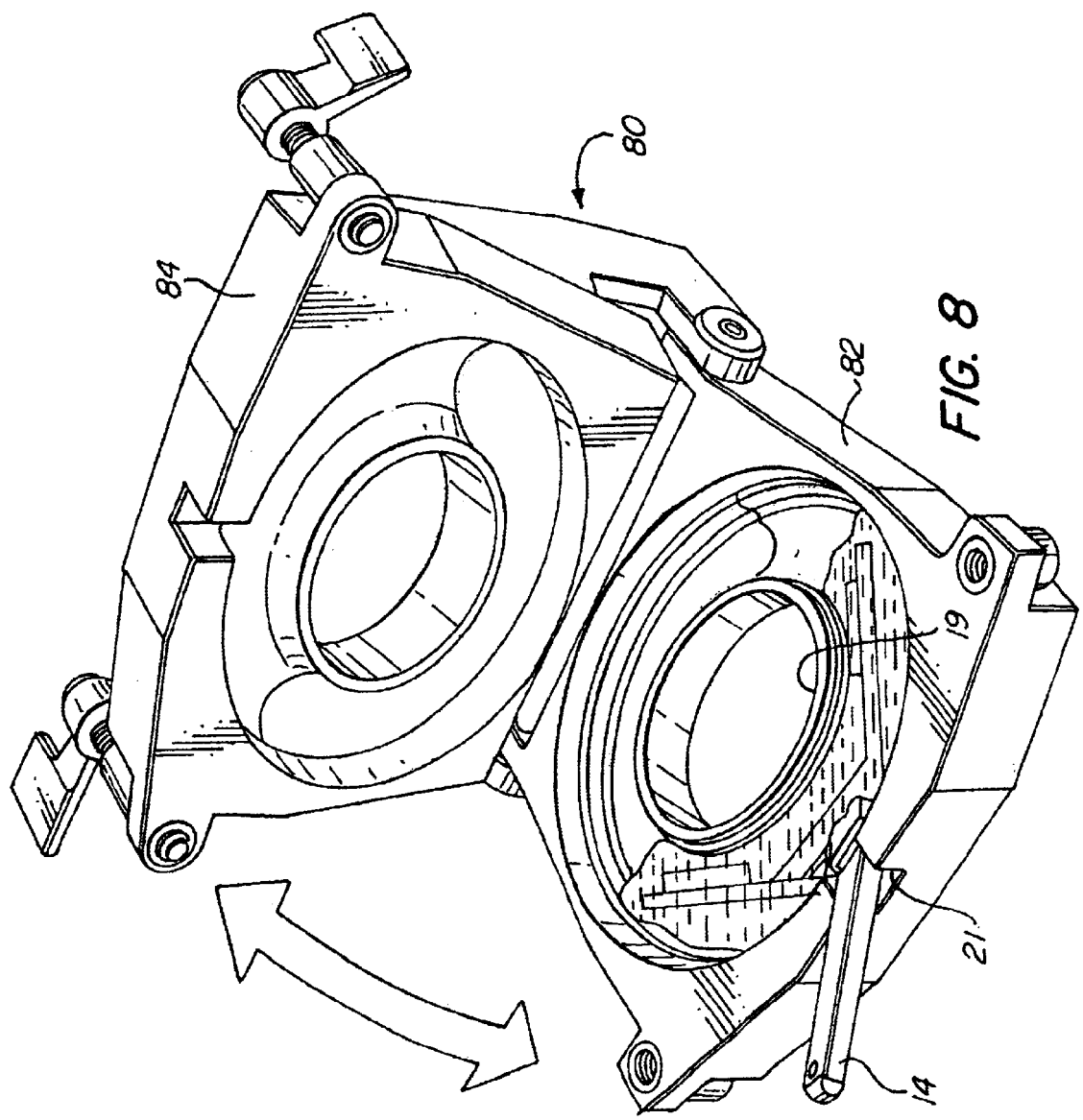
FIG. 8 is a perspective view of the backrest mold in an open position with the resin layers and metal frame positioned therein.
Figure 9:
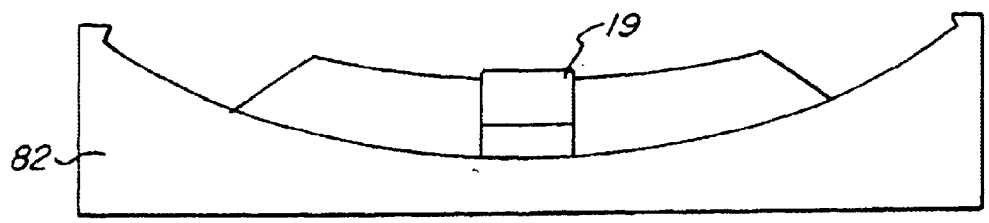
FIG. 9 is a sectional view of the empty lower mold.

In fabricating and assembling the motorcycle backrest 10, a mold 80 having a lower element 82 and an upper element 84, as shown in FIGS. 8–13, is employed. The mold 80 is dimensioned and configured to form the frame 16 and the foam cushion 32 with the opening 15 therein by reason of the cylindrical post 19. As shown in FIG. 9, a first layer 86 of rigid fiber reinforced resin is placed in the lower element 82 of the mold 80. While a variety of different types of resins and reinforcing agents can be used, polyurethanes are the preferred resins and more particularly, hybrid polyurethane polyesters. Preferred reinforcing agents include fiberglass and reinforced glass fibers which can be cut or chopped into strands prior to mixing with the resin-forming reactants.

Figure 10:
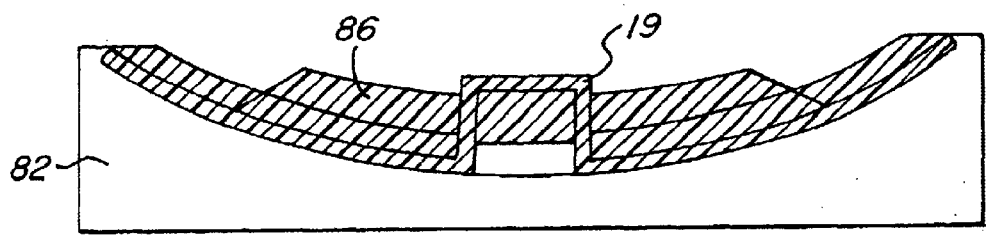
FIG. 10 is a sectional view of the lower mold with the fiberglass layer disposed therein and at a point spaced from the frame.
Figure 11:
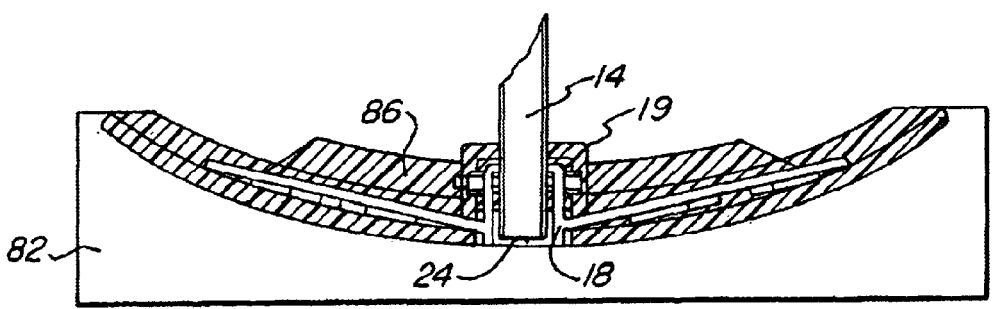
FIG. 11 is a sectional view of the lower mold showing the metal frame encapsulated in the fiberglass base.
Figure 12:
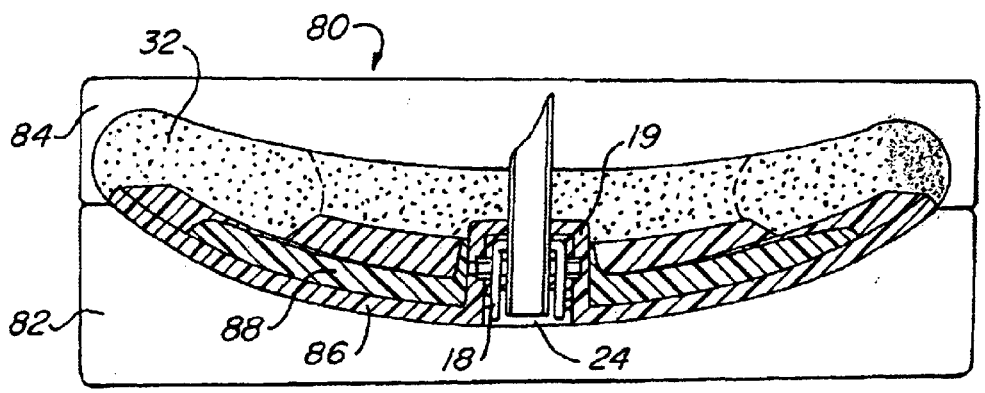
FIG. 12 is a sectional view of the closed backrest mold showing the foam layer molded over the fiberglass base.

The metal mounting assembly 18 with the support arm 14 bolted thereto is placed on top of the first layer of resin, as shown in FIG. 10. The support arm 14 extends outwardly through a channel 21, and a second layer 88 of the fiber reinforced resin is then placed over the rods 27, 28 and arms 29, 30, as is shown in FIGS. 8 and 11. The slot 24 is not filled with resin. The resin is then at least partially cured to bond the first layer 86 to the second layer 88, and thereby encapsulate the mounting assembly 18 in the frame 16.

A foamable synthetic resin formulation which will produce a resiliently deflectable cushion such as a flexible polyurethane is subsequently applied on top of the partially cured resin and the upper element 84 of the mold is closed over the cavity in the lower element 82. Upon heating, the polyurethane forms the flexible foam cushion 32 which is chemically bonded with the second layer 88 of resin. Some resin formulations may be selected which do not require heat to form and cure.

The assembly of the cured cushion 32, frame 16 and mounting post or arm 14 is removed from the mold 80, and the flexible cover 34 is placed over the cushion 12. As indicated above, the inner portion 35 and the peripheral portion 37 of the cover 34 are fastened to the back side of the frame 16 with rivets 36. The finishing or cover plate 38, which preferably is formed from a synthetic resin, is mounted over the rivets 36 to give the backrest 10 a finished appearance and to prevent the rivets 36 from loosening during use of the backrest 10.

The back support cushion 12 is ergonomically configured to be gripped from behind by a passenger as is shown in FIG. 1. The cushion 12 has a large central aperture 15 and a peripheral portion which are dimensioned to receive the passenger's thumb from the rear side and the passenger's fingers from the front side. In the illustrated embodiment, the back support cushion 12 has an oval shape with a height of about 6–¼ inches, a width of about 7–¼ inches, and a thickness of about ¾–3 inches. The upper end is thinner than the lower end. The central aperture 15 has a height of about 2–7 inches and a width of about 2–½–8 inches. The height and width of the central aperture 15 typically are each about 30–60% of the overall height and width of the support cushion 12, and preferably 35–55%.

Thus, it can be seen from the foregoing detailed specification and attached drawings that the method of the present invention provides a motorcycle backrest with a convenient and safe configuration for a passenger handhold while simultaneously providing comfort and support to the driver. By manufacturing the backrest to include metal reinforcing rods and/or plates encapsulated within the rigid resin frame, the backrest is sturdy and will withstand prolonged use. Inclusion of angle adjustment means and height adjustment and means for the back support cushion maximizes the comfort of the user.

The use of a finishing or cover plate on the rear surface contributes to durability and gives the motorcycle backrest an aesthetically pleasing look since it may be provided with a color coordinated with that of the motorcycle. The aperture in the backrest provides comfort to the user in hot weather by increasing air circulation around the user's back. When mounted in the passenger position, the backrest is a convenient structure for securing a package with bungee cords or the like. The backrest can be readily removed when not needed and subsequently can be conveniently reinstalled.

Having thus described the invention, what is claimed is:

1. A method for making a motorcycle seatback with an aperture extending therethrough comprising:

(a) providing a mold having a base with a cavity providing the desired peripheral configuration for the backrest and an upstanding post centrally thereof, and a channel extending through the side wall of the mold from said cavity to the exterior of the mold;

(b) introducing into said cavity a first deposit of a resin formulation;

(c) placing on said first deposit of said resin formulation one end of a rigid frame member having a post extending outwardly of said mold cavity through said channel and having arms laterally extending to opposite sides of said post;

(d) introducing a second deposit of a resin formulation into said cavity over an upper end of said rigid frame member to bond with said first deposit and encapsulate said upper end between said deposits;

(e) at least partially curing said resin formulations of said first and second deposits to provide a rigid synthetic resin base;

(f) introducing a cushion resin formulation into said mold cavity over said at least partially cured resin of said first and second deposits, said cusion resin formulation being curable into a resiliently deflectable cushion layer;

(g) curing said cushion resin formulation to provide a seatback structure with an aperture extending therethrough and said post depending therefrom;

(h) removing said seatback structure from said mold;

(i) forming a flexible cover over the surface of said cushion layer of said seatback structure and about an outer periphery of said seatback structure and through said aperature;

(j) securing said cover to an opposite surface of said seatback structure; and (k) securing to said opposite surface a cover plate having an opening extending therethrough aligned with said apartures in said seatback structure.

2. The method for making a motorcycle seatback in accordance with claim 1 wherein said mold includes a cover and said method includes the step of closing said cover over said mold cavity after the step of introducing said cushion resin formulation.

3. The method for making a motorcycle seatback in accordance with claim 2 wherein said cushion resin formulations is a foamable polyurethane formulation which expands to fill said cavity.

4. The method for making a motorcycle seatback in accordance with claim 1 wherein said resin formulations of said first and second deposits is fiber reinforced.

5. A method of making a motorcycle backrest in accordance with claim 1 wherein step (b includes the steps of (i) forming a first layer of reinforced resin, (ii) placing said one end of said frame on said first layer, said one end of said frames including a bracket, and (iii) forming a second layer of reinforced resin over said first layer and frame, thereby encapsulating the upper end of said frame.

6. The method of making a motorcycle backrest in accordance with claim 1 wherein said cover plate is formed from a synthetic resin.

7. A method of making a motorcycle backrest comprising:

(a) providing a rigid frame having a post and laterally extending portions at one end thereof;

(b) encapsulating said one end of said frame in a relatively rigid resin to provide a seatback body with an aperture extending therethrough;

(c) providing a resilient foam layer over one surface of said seatback body, said foam layer having an opening extending therethrough;

(d) forming a flexible cover over said foam layer and about the periphery of said seatback body onto an opposite surface thereof and through said aperture and onto said opposite surface;

(e) fastening said cover to said opposite surface; and (f) mounting a cover plate over said cover on said opposite surface.

8. The method of making a motorcycle backrest in accordance with claim 7 wherein said frame includes a bracket engaged with said post and at least one load disseminating element which imparts strength to the connection between said post said bracket.

9. The method of making a motorcycle backrest in accordance with claim 7 wherein step (b) and (c) are conducted in a mold.

* * * * *